United States Patent

[11] 3,611,814

| [72] | Inventors | August F. Haack;<br>Semon P. Vincent, both of Torrance, Calif. |
|---|---|---|
| [21] | Appl. No. | 844,583 |
| [22] | Filed | July 24, 1969 |
| [45] | Patented | Oct. 12, 1971 |
| [73] | Assignee | TRW Inc.<br>Redondo Beach, Calif. |

[54] SPIN ROTOR ASSEMBLY
14 Claims, 3 Drawing Figs.

[52] U.S. Cl. .................................................. 74/5
[51] Int. Cl. .................................................. G01c 19/02
[50] Field of Search ........................................ 74/5, 5.7;
103/111; 308/9, 122; 417/53

[56] References Cited
UNITED STATES PATENTS

| 3,027,471 | 3/1962 | Burgwin et al. | 74/5.7 X |
| 3,439,961 | 4/1969 | Stiles | 308/9 |

*Primary Examiner*—Robert M. Walker
*Attorneys*—Daniel T. Anderson, Donald R. Nyhagen and Jerry A. Dinardo ABSTRACT: A high-speed spin rotor assembly having a hermetic casing filled with gas, preferably under subatmospheric pressure, and containing a motor-driven spin rotor including an inertial wheel with a central shaft rotatably supported by gas bearing means. Pumping means, such as helical pumping grooves surrounding the shaft, are provided for continuously pumping gas from the interior region of the casing surrounding the inertial wheel to the gas bearing means to reduce the viscous drag of the gas on the wheel and concurrently pressurize the gas bearing means. The disclosed method of operating the spin rotor assembly.

PATENTED OCT 12 1971 3,611,814

August F. Haack
Semon P. Vincent
INVENTORS

BY Donald R. Nyhagen
ATTORNEY

SPIN ROTOR ASSEMBLY

BACKGROUND OF THE INVENTION

1. Field of the Invention

This invention relates generally to a high-speed spin rotor assembly and operating method therefor. More particularly, the invention relates to such a spin rotor assembly and operating method characterized by low windage and friction loss, high reliability, compact size and light weight.

2. Prior Art reservoir.

Many inertial devices, such as gyroscopes, accelerometers, and the like embody a spin rotor which is driven at a high spin rate to generate inertial forces. The spin rotor is enclosed in a casing and has a relatively massive inertial wheel fixed to a central supporting shaft which is rotatably mounted in the casing. A motor is coupled to the rotor for driving the latter at the required spin rate.

Spin rotor devices of this kind present two basic design problems. One of these problems involves reduction of the viscous drag force on the inertial wheel of the spin rotor so as to minimize windage loss. The other problem involves reduction of the frictional drag on the spin rotor shaft so as to minimize friction loss. The obvious method of reducing windage loss is to evacuate the spin rotor casing to a reduced pressure level and thereby reduce the viscous drag imposed on the spin rotor. The best method of reducing friction loss, on the other hand, is to employ gas bearings for rotatably supporting the spin rotor shaft.

Up to the present time, these two optimum design techniques have not been utilized in combination in a spin rotor assembly. The reason is that no method has been devised for providing the requisite gas under pressure to the gas bearings for the spin rotor shaft and concurrently evacuating the gas from the region surrounding the spin rotor wheel. As a consequence, the existing spin rotor devices which reduce windage loss by enclosure of the spin rotor in an evacuated hermetic casing employ ball or roller bearings for the rotor shaft. Such bearings, however, are characterized by relatively high friction loss, low operational reliability, and large size and weight. Conversely, the existing spin rotor devices which reduce friction loss by utilizing gas bearings exhibit excessive windage loss due to the viscous drag imposed by the gas on the spin rotor wheel.

SUMMARY OF THE INVENTION

The present invention provides an improved spin rotor device or assembly, and an operating method therefore, which accomplish both reduced friction loss by employing gas bearings to support the spin rotor shaft and reduced windage loss by evacuating, to a subatmospheric pressure, the bearing gas from the region about the spin rotor wheel. To these ends, the spin rotor is enclosed within a hermetic casing containing a suitable bearing gas, preferably under subatmospheric pressure. This bearing gas may be air or any other suitable gaseous fluid. Within the casing are a wheel cavity containing the inertial wheel of the spin rotor and bearing cavity for each gas bearing. In this regard, it should be noted that the invention contemplates within its scope a rotor assembly in which the spin rotor is supported by a single gas bearing, although the disclosed embodiment of the invention utilizes two gas bearings for this purpose.

According to a primary feature of the invention, during operation of the spin rotor assembly, bearing gases are continuously pumped from the wheel cavity to each bearing cavity in such a way as to inhibit return flow of the gas to the wheel cavity. This pumping action thus accomplishes the dual function of evacuating the gas from the wheel cavity to reduce windage loss and pressurizing each gas bearing to reduce friction loss.

In the disclosed embodiment of the invention, the pumping means for pumping the bearing gas from the wheel cavity to each bearing cavity is essentially a conventional screw-type pump including a helical pumping groove surrounding the spin rotor shaft in the region between the cavities. One end of each pumping groove opens to the wheel cavity. The other end of the groove communicates to the adjacent bearing cavity through an intervening gas reservoir. The spin rotor is driven by a motor sealed within the hermetic casing.

DESCRIPTION OF THE PREFERRED EMBODIMENTS

Figures 1, 2, 3:
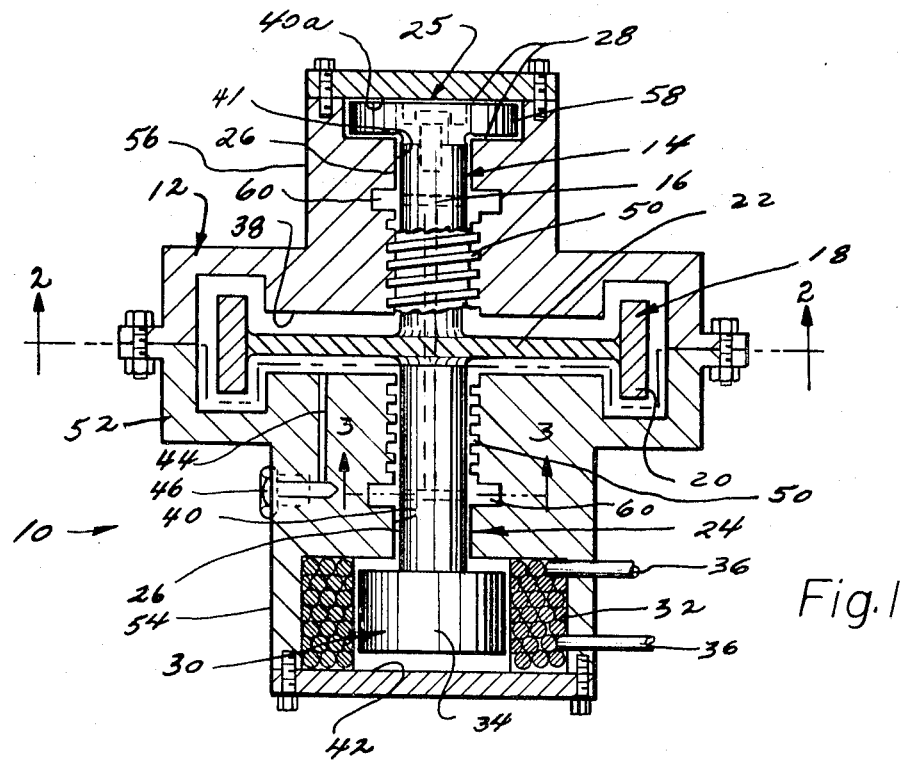
FIg. 1 is a section through a spin rotor assembly according to the invention.
FIG. 2 is a section taken on line 2—2 in FIG. 1.
FIG. 3 is a section taken on line 3—3 in FIG. 1

Turning now to these drawings, there is illustrated a spin rotor assembly 10 according to the invention. This rotor assembly has an outer hermetic casing 12 enclosing a spin rotor 14. Rotor 14 has a central shaft 16 mounting an inertial wheel 18. This inertial wheel has an outer relatively massive rim 20 joined to the shaft 16 by a relatively thin disk 22. The wheel is located between the ends of the shaft. The ends of the shaft are rotatably supported in the casing 12 by gas bearings 24, 25, each including a radial gas bearing 26. Gas bearing 25 also includes gas thrust bearings 28.

Spin rotor 14 is driven at a high rate by an electric motor 30. In this instance, the motor is housed within the hermetic casing 12, at one end of the rotor shaft 16. The motor includes a stator winding 32 fixed within the casing and an armature 34 fixed to the shaft. The motor leads 36 extend to the exterior of and are sealed to the wall of the casing.

According to the present invention, the interior of the casing 12 is shaped to define a wheel cavity 38 containing the spin rotor wheel 18 and bearing cavities 40, 41 containing the gas bearings 24, 25, respectively. The rotor drive motor 30 is contained within a motor cavity 42 which effectively forms an extension of the adjacent bearing cavity 40. Extending through the wall of the casing 12 is a passage 44 through which the interior of the casing may be filled with a suitable bearing gas, preferably under subatmosphere pressure. As noted earlier, this bearing gas may be air or any other suitable gaseous fluid. In the case of air, the passage 44 is utilized merely to evacuate air from the casing to the desired subatmospheric pressure level. In the case of other bearing gas, the passage is used to evacuate air from the casing and thereafter introduce the bearing gas into the casing. The passage is closed by a plug 46 which may be threaded into the casing.

Pumping means 50 are provided for continuously pumping gas from the wheel cavity 38 to each bearing cavity 40, 41 during operation of the spin rotor assembly. This pumping action evacuates bearing gas from the wheel cavity to reduce the viscous drag imposed by the gas on the spin rotor wheel 18 and concurrently pressurizes the gas bearings 24, 25 to reduce the frictional drag imposed on the rotor shaft 16.

In the particular embodiment of the invention selected for illustration, the hermetic casing 12 has a radially enlarged cylindrical midportion 52 containing the wheel cavity 38 and reduced cylindrical end portions 54, 56 containing the bearing cavities 40, 41 and motor cavity 42. The wheel cavity 38 has a transverse cross section of the same general shape as, but somewhat larger than that of the spin rotor wheel 18 so as to provide a narrow clearance space about the wheel. The bearing cavities 40, 41 comprise bores extending axially through the casing end portions 54, 56. Portions of these bores define, with the adjacent surface portions of the thin rotor shaft 16, the bearing surfaces of the gas radial bearings 26. The gas bearing cavity or bore 40 has a radially enlarged outer end portion 40a containing a radially enlarged disc 58 fixed on the adjacent end of the rotor shaft 16. The bore portion 40a and the disc 58 provide the bearing surfaces of the gas thrust bearings 28. It will be understood that the rotor shaft and bearing cavities are sized to provide the proper gas bearing clearance between the various bearing surfaces.

The illustrated gas pumping means 50 effectively comprise conventional screw-type pumps including generally spiral or helical pumping grooves surrounding the spin rotor shaft 16 in the regions between the wheel cavity 38 and the bearing cavities 40, 41. Each pumping groove opens at one end to the wheel cavity. The other end of each pumping groove communicates to the adjacent bearing cavity through an intervening annular gas reservoir 60 about the shaft. In this instance, the pumping grooves are formed in the walls of the casing and the reservoirs comprise annular grooves in these walls. It will be understood, however, that either or both the pumping grooves and the reservoir grooves may be formed in the surface of the spin rotor shaft.

It will now be understood that during operation of the spin rotor assembly 10, the spin rotor 14 is driven at a high spin rate by its motor 30. High-speed rotation of the spin rotor effectively actuates the pumping means 50 to continuously pump gas from the wheel cavity 38 to the bearing cavities 40, 41. This pumping action evacuates the wheel cavity to a reduced pressure level, thereby reducing the viscous drag imposed on the spin rotor wheel 18, by the bearing gas, and simultaneously pressurizes the gas bearings 24, 25 to reduce the frictional drag imposed on the spin rotor shaft 16. The gas bearings rotatively support the rotor shaft in both the radial and axial directions. Recuction of the viscous drag and frictional drag reduces the windage loss and friction loss occasioned by high-speed rotation of the spin rotor and, thereby, reduces the driving power required to rotate the spin rotor at the desired high spin rate. Utilization of gas bearings also reduces the overall size and weight of the assembly and increases its operational reliability. The gas reservoirs 60 may communicate through a passage 62 in the spin rotor shaft to balance the gas bearing pressures.

What is claimed as new in support of Letters patent is:

1. A high-speed spin rotor assembly comprising: :
   - a spin rotor including a shaft and an inertial wheel fixed to said shaft;
   - a sealed airtight casing enclosing said spin rotor including a wheel cavity containing said wheel and a bearing cavity containing one end of said shaft;
   - said shaft end and said bearing cavity having confronting surfaces providing a gas bearing for rotatably supporting said shaft;
   - said shaft end and said bearing cavity having confronting surfaces providing a gas bearing for rotatably supporting said shaft;
   - said casing containing a gas of fixed mass;
   - means for continuously pumping said gas from said wheel cavity to said bearing cavity and inhibiting return flow of said gas from said bearing cavity to said wheel cavity, thereby to simultaneously evacuate said wheel cavity to a reduced pressure level and pressurize said gas bearing.

2. A spin rotor assembly according to claim 1, wherein:
   said casing is filled with gas under a subatmospheric pressure.

3. A spin rotor assembly according to claim 1, wherein:
   said casing has an internal surface surrounding a portion of said shaft between said wheel cavity and said bearing cavity and disposed in close confronting relation to the surface of said shaft portion; and
   said pumping means comprise a generally helical pumping groove in one of said surfaces surrounding said shaft and communicating at one end to said wheel cavity and at its other end to said bearing cavity.

4. A spin rotor assembly according to claim 3, including:
   a gas reservoir between and communicating said other end of said pumping groove and said bearing cavity.

5. A spin rotor assembly according to claim 4, wherein:
   said gas reservoir comprises an annular groove about said shaft.

6. A spin rotor assembly according to claim 1, including:
   means for driving said spin rotor.

7. A spin rotor assembly according to claim 6, wherein:
   said driving means comprises an electric motor sealed within said casing.

8. A spin rotor assembly according to claim 7, wherein:
   said casing is filled with said gas under a subatmospheric pressure;
   said casing has an internal surface surrounding a portion of said shaft between said wheel cavity and said bearing cavity and disposed in close confronting relation to the surface of said shaft portion;
   said pumping means comprise a generally helical pumping groove in one of said surfaces surrounding said shaft and communicating at one end to said wheel cavity and at the other end to said bearing cavity; and
   a gas reservoir between and communicating said other end of said pumping groove to said bearing cavity including an annular groove about said shaft between said other end of said pumping groove and said bearing cavity.

9. A high-speed spin rotor assembly comprising:
   a rotor including a shaft and an inertial wheel fixed to said shaft between the ends thereof;
   a sealed airtight casing enclosing said spin rotor including a wheel cavity containing said wheel and bearing cavities containing the ends, respectively, of said shaft;
   each end of said shaft and the corresponding bearing cavity having confronting surfaces providing a gas bearing for rotatably supporting the adjacent end of said shaft;
   said casing containing a gas of fixed mass; and
   means for continuously pumping gas from said wheel cavities to said bearing cavities and inhibiting return flow of gas from said bearing cavities to said wheel cavity, thereby of simultaneously evacuate said wheel cavity to a reduced pressure level and pressurize said gas bearings.

10. A spin rotor assembly according to claim 8, wherein:
    said casing is filled with said gas under subatmospheric pressure.

11. A spin rotor assembly according to claim 8, wherein:
    said casing has an internal surface surrounding a portion of said shaft between said wheel cavity and each bearing cavity and disposed in close confronting relation to the surface of said shaft portion; and
    said pumping means comprise a generally helical groove in one surface of each of said confronting surfaces communicating at one end to said wheel cavity and at the other end to the adjacent bearing cavity.

12. A spin rotor assembly according to claim 11, including:
    a gas reservoir between and communicating the other end of each pumping groove to the adjacent bearing cavity.

13. A spin rotor assembly according to claim 8, including:
    a motor sealed within said casing at one end of said spin rotor shaft for driving said spin rotor in rotation.

14. The method of operating a high-speed spin rotor assembly having a spin rotor with a shaft and an inertial wheel fixed to said shaft, a sealed airtight casing enclosing said rotor including a wheel cavity containing said wheel and a bearing cavity containing a gas bearing rotatably supporting said shaft, and a gas of fixed mass within said cavities, said method comprising the steps of:
   driving said spin rotor at a high spin rate; and
   continuously pumping said gas from said wheel cavity to said bearing cavity and inhibiting return flow of the gas to said wheel cavity during rotation of said spin rotor to simultaneously evacuate the gas from said wheel cavity to a reduced pressure level to reduce the viscous drag of said gas on said wheel and pressurize said gas bearing to reduce the frictional drag on said rotor shaft.